(No Model.)
J. SHAW & M. CLANCY, Jr.
DEVICE FOR DESTROYING NOXIOUS PLANTS.
No. 489,167. Patented Jan. 3, 1893.
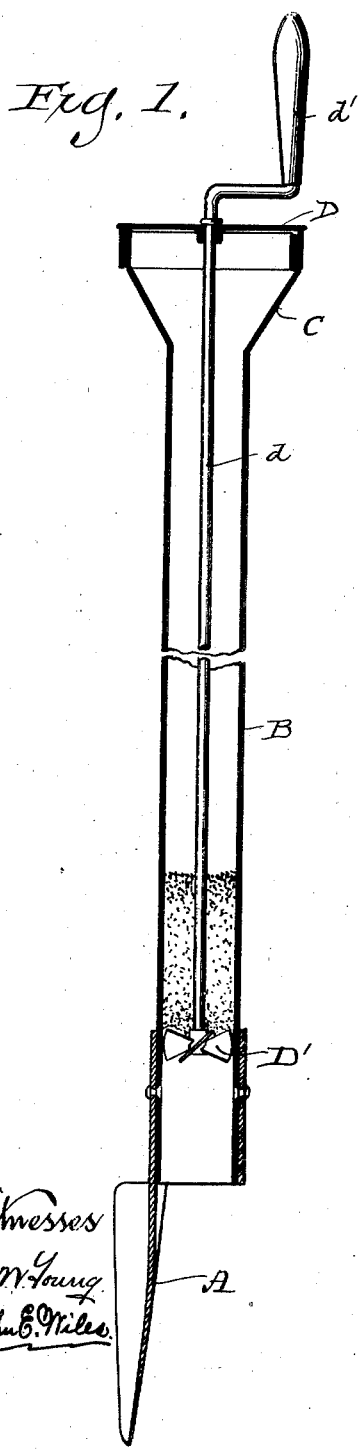
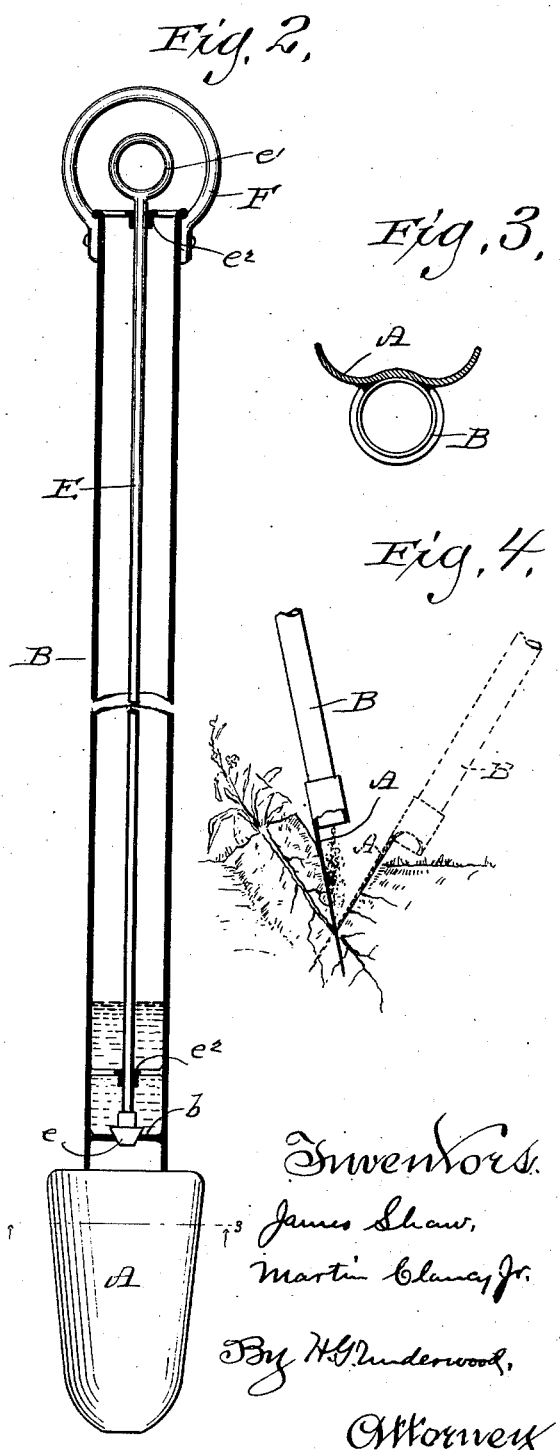

UNITED STATES PATENT OFFICE.

JAMES SHAW AND MARTIN CLANCY, JR., OF RACINE, WISCONSIN.

DEVICE FOR DESTROYING NOXIOUS PLANTS.

SPECIFICATION forming part of Letters Patent No. 489,167, dated January 3, 1893.

Application filed July 12, 1892. Serial No. 439,768. (No model.)

*To all whom it may concern:*

Be it known that we, JAMES SHAW and MARTIN CLANCY, Jr., both citizens of the United States, and residents of Racine, in the county of Racine, and in the State of Wisconsin, have invented certain new and useful Improvements in Devices for Destroying Noxious Plants; and we do hereby declare that the following is a full, clear, and exact description thereof.

Our invention relates to new and useful improvements in devices for destroying weeds and noxious plants by the application of a root destroying agent to the roots thereof, and our said invention consists in the matters hereinafter described and pointed out in the appended claims.

In the accompanying drawings illustrating our invention:—Figure 1. is a vertical longitudinal sectional view of a device constructed in accordance with our invention. Fig. 2. is a similar view illustrating a somewhat different form of our improved device. Fig. 3. is a cross sectional view of the same taken on line 3—3 of Fig. 2. Fig. 4. is a view illustrating the manner of using our improved device.

In said drawings:—A represents a suitable cutting blade, to which is secured a handle B, which handle is preferably made tubular as shown. A reservoir C is preferably provided at the upper end of the handle B and is arranged to hold a supply of the root destroying agent. Any desired means may be employed for feeding the root destroying agent such as common salt either in the dry state or as a strong brine or any other suitable material from the reservoir, and we therefore do not wish to limit ourselves to the exact form of feeding devices illustrated in the drawings.

In the particular form of construction illustrated in Fig. 1. the tubular handle B is arranged to communicate with the lower end of the receptacle C, as shown and virtually forms a part of the reservoir for holding the supply of the root destroying agent. The lower end of the tubular handle is arranged to discharge the destroying agent immediately in the rear of the blade A as best shown in Fig. 1. A cap D is provided at the top of the reservoir and a revoluble shaft $d$ is journaled centrally in said cap and extends downwardly through the tubular handle, the upper end of said shaft being provided with a crank $d'$. At the lower end of the said shaft $d$, is secured a revoluble feeding device D', which is conveniently made in the form of a screw conveyer. It follows from this construction that a rotation of the handle $d'$ and shaft $d$, will cause the feeding device D' to operate to discharge a portion of the destroying agent from the lower end of the tubular handle in an obvious manner. This particular form of our device is designed for use in applying destroying agents of a granular form, such for instance as salt.

The particular form of device illustrated in Fig. 2, however is designed for use in applying destroying agents of liquid form, and in this form of our device, an apertured bottom $b$, is provided at the lower end of the tubular handle B. A vertically movable rod E is arranged within the said tubular handle and carries at its lower end a suitable valve $e$, which is arranged to close the aperture in the bottom $b$ of the said tubular handle, and at the upper end of said rod is provided a suitable ring or handle $e'$, by means of which said rod may be raised to open the valve for the escape of the liquid destroying agent. The rod E is conveniently arranged to slide in bearings $e^2$ $e^2$ at the upper and lower ends of the tubular handle. A handle F is preferably provided at the upper end of the said handle B, for convenience of operation. It follows from this construction that in order to cause a portion of the destroying agent to be discharged, it is only necessary to raise the rod E by the ring $e'$ so as to open the valve, when the liquid contained in the tubular handle will be free to escape therethrough. After a sufficient amount of the liquid has escaped, the valve may be closed by simply releasing the ring and allowing the rod with the valve to return to their normal position by gravity.

The operation of our improved device is as follows:—The reservoir for holding the destroying agent is first filled with the desired material, the operator then inserting the cutting blade A into the ground in the manner illustrated in Fig. 4, by the dotted lines, so as to sever the root of the weed or plant to be destroyed. He then raises the handle B so as to cause the device to assume the position illustrated in said figure in full lines, thus making a slight opening in the ground and exposing the severed end of the root, when, by an operation of the discharging device as before described, he causes a portion of the destroying agent to be discharged onto the cut root in an obvious manner. The blades being then withdrawn, the earth raised thereby may be readily pressed back into its original position so as to bring the severed end of the top portion of the weed or plant down into contact with the destroying agent which has been deposited in the opening made in the ground by the operation of the blade. In this manner, the weeds or other noxious plants may be effectually killed, the application of the destroying agent to the cut ends of the root operating to permanently destroy the entire root and plant.

An objection arising in the employment of the various kinds of root pulling tools, is that almost invariably some portion of the root is left in the ground, which will after a time, sprout and produce another plant, but by the employment of our improved device, the entire root is destroyed and there is therefore no liability of the growth of another plant therefrom.

As our device is chiefly intended for the destruction of noxious plants growing in turf or grass-land, it is necessary to exert considerable pressure to force the implement to place, and hence the blade A is preferably formed as shown with curved portions extending laterally on each side of the line of the handle to form a foot-rest, to aid in securing said pressure, and as already stated (and best shown in Fig. 3) the said blade is wholly in front of the tubular handle, so that the contents of the latter will be discharged directly at the rear of said blade for the purpose and reason already set forth.

Having thus described our invention, what we claim as new and desire to secure by Letters Patent of the United States, is:—

1. A device for destroying weeds and noxious plants, comprising a suitable cutting blade adapted to be operated to sever the roots of said plants, and suitable means for feeding a destroying agent thereto, immediately in the rear of said blade substantially as described.

2. A device for destroying weeds and noxious plants, comprising a cutting blade adapted to be operated to sever the roots of the plants, a reservoir for holding a supply of root destroying agent, and suitable means for feeding said destroying agent to the cut ends of the roots, immediately in the rear of said blade substantially as described.

3. A device for destroying weeds and noxious plants, comprising a suitable cutting blade for severing the roots of the plants, a receptacle for holding a supply of a destroying agent, a device located at the bottom of said receptacle for regulating the discharge of the destroying agent therefrom, and suitable means located upon the outside of the device for actuating said regulating device to discharge a portion of the destroying agent upon the severed ends of the roots, immediately in the rear of said blade substantially as described.

4. A device for destroying weeds and noxious plant, comprising a cutting blade for severing the roots of the plants, a tubular handle connected therewith, a reservoir for holding a supply of a destroying agent and communicating with the said reservoir, and suitable means for feeding said destroying agent from the lower end of said tubular handle upon the cut ends of the roots, immediately in the rear of said blade substantially as described.

5. A device for destroying weeds and noxious plants, comprising a tubular handle, a cutting blade connected thereto, in front of the said tubular handle and projecting laterally on each side thereof, to afford a foot-rest, a reservoir for holding a supply of a destroying agent communicating with said handle, and suitable means for feeding said destroying agent from the lower end of said tubular handle upon the cut ends of the roots, immediately in the rear of said blade substantially as described.

6. A device for destroying weeds and noxious plants, comprising a tubular handle, a cutting-blade connected thereto in front of the said tubular handle, a reservoir for holding a supply of a destroying agent communicating with said handle, a closed cap for the top of said reservoir, a revoluble shaft centrally journaled in said cap, and extending downward into the tubular handle, a crank or handle at the upper outer end of said shaft, and a screw-conveyer at the lower inner end of said shaft for feeding the said destroying agent upon the cut ends of the roots, substantially as set forth.

In testimony that we claim the foregoing we have hereunto set our hands, at Racine, in the county of Racine and State of Wisconsin, in the presence of two witnesses.

JAMES SHAW.
MARTIN CLANCY, JR.

Witnesses:
H. G. UNDERWOOD,
HATTIE M. LUND.